United States Patent [19]

Patterson et al.

[11] 4,019,210

[45] Apr. 26, 1977

[54] WATER-INFLATED PORTABLE SPA

[75] Inventors: Richard G. Patterson, Rialto; Thaddeus W. Fuller, Pomona, both of Calif.

[73] Assignee: Muskin Corporation, Colton, Calif.

[22] Filed: Apr. 12, 1976

[21] Appl. No.: 676,303

[52] U.S. Cl. .................................. 4/172; 4/172.19; 4/177 CW

[51] Int. Cl.² ...................... E04H 3/16; E04H 3/18; F16L 22/02

[58] Field of Search ............ 4/172.19, 172, 172.15, 4/172.21, 177 CW, 172.12

[56] References Cited

UNITED STATES PATENTS

| | | | |
|---|---|---|---|
| 2,505,845 | 5/1950 | Alvaraz | 4/177 CW |
| 3,233,251 | 2/1966 | Barrera | 4/172.19 |
| 3,363,268 | 1/1968 | Friedlander | 4/172 |
| 3,488,782 | 1/1970 | Billig et al. | 4/172 |
| 3,616,468 | 11/1971 | Takacs | 4/172.15 |
| 3,781,925 | 1/1974 | Curtis et al. | 4/172.15 |
| 3,943,580 | 3/1976 | Carter | 4/172.15 |

*Primary Examiner*—Henry K. Artis

*Attorney, Agent, or Firm*—Christie, Parker & Hale

[57] ABSTRACT

A portable spa in which a confining outer wall rests on the ground or other flat surface. A water impervious liner is suspended from the top of the wall and forms a barrier for holding water. The liner is formed with a double-wall construction with an inner sheet attached around the margins to the outer sheet to form a confined space. A pump for recirculating water through the pool has its outlet connected through a conduit to the confined space so that water is forced into the confined space under pressure. A portion of the inner sheet is shaped to form a raised seat on the bottom of the pool when inflated, while another portion of the inner sheet extends above the seat to form a back rest when inflated. The pump directs water through a series of jets through the sides of the pool to provide a massaging action.

14 Claims, 2 Drawing Figures

WATER-INFLATED PORTABLE SPA

FIELD OF THE INVENTION

This invention relates to portable above-ground pools, and more particularly, is concerned with a therapeutic pool or spa having water-inflated seats.

BACKGROUND OF THE INVENTION

The use of therapeutic pools or spas is well known. Typically such pools allow the user to relax in the pool in a seated or reclined condition with the major portion of his body immersed. Jets of water may be provided to create a general massaging action. Conventionally, spas have been constructed using the same construction techniques as conventional below-grade swimming pools. The walls of the pools can be constructed to provide seating areas in the form of benches or other suitable supporting surfaces on which persons using the pool can sit or recline. Tubs of course have been used to provide the same effects for individual users. Neither approach is suitable for providing a low cost portable spa which can accommodate a number of people when in used and yet can be readily dismantled and packed away in a small space when not in use.

SUMMARY OF THE INVENTION

The present invention is directed to an improved design for a portable spa or therapeutic pool which is of light weight construction that can be packed away in a box when not in use and yet is as easy to install as above-ground pools. The spa is capable of accommodating four or six people, for example. In addition, the present invention provides a spa which, when assembled, provides seating in the pool which allows the users to remain in a relaxed position with their bodies fully submerged. The pool, when assembled, provides water recirculation in which the water is filtered, heated, and discharged through suitable jets to provide the desired therapeutic action.

More specifically, the present invention provides a portable spa constructed along the lines of above-ground swimming pools in which a semi-rigid outer wall resting on a flat surface, such as the ground, supports a watertight liner. When filled with water, the liner is pressed against the ground and the surrounding side wall, the side wall being put under tension and confining the water. According to the present invention, the liner is made of double wall construction, providing a confined space between the walls which is inflated by pumping water into the confined space from a recirculating pump. The inner wall of the liner is shaped so that when inflated with water under pressure it forms a bench or seating ledge around the side of the pool beneath the water level in the pool. Another portion of the inner wall provides a back rest above the seat. Small jet holes may be provided in the inner wall of the seat and back area to provide a gentle massaging action. The inflated seat provides a cushion action which, while easily supporting the weight of persons sitting in the pool, readily conforms to the shape of a person's body to give uniform comfortable support.

DESCRIPTION OF THE DRAWINGS

For a better understanding of the invention, reference should be made to the accompanying drawings, wherein.

DETAILED DESCRIPTION

Figure 1:
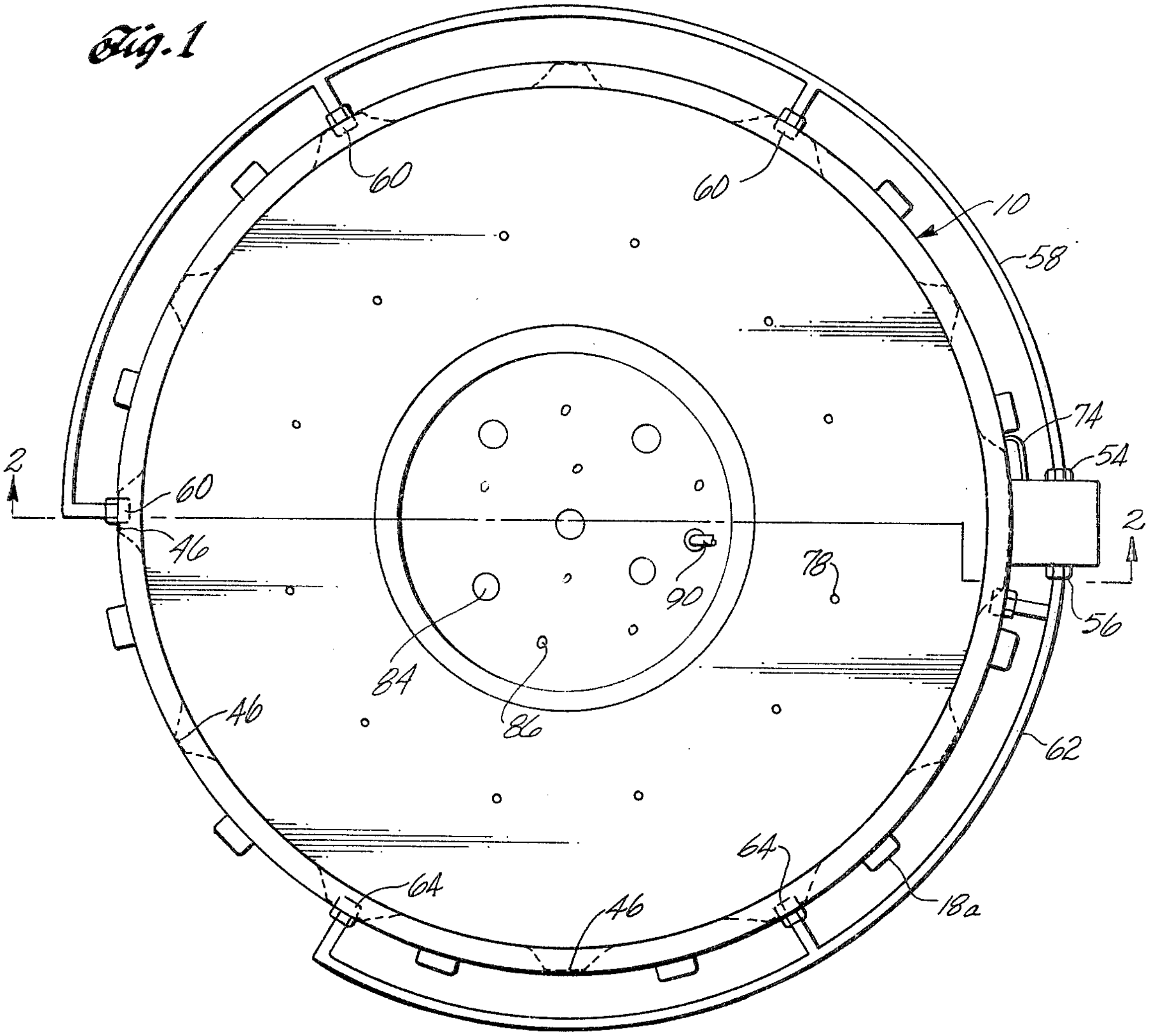
FIG. 1 is a top view of one embodiment of the present invention.
Figure 2:
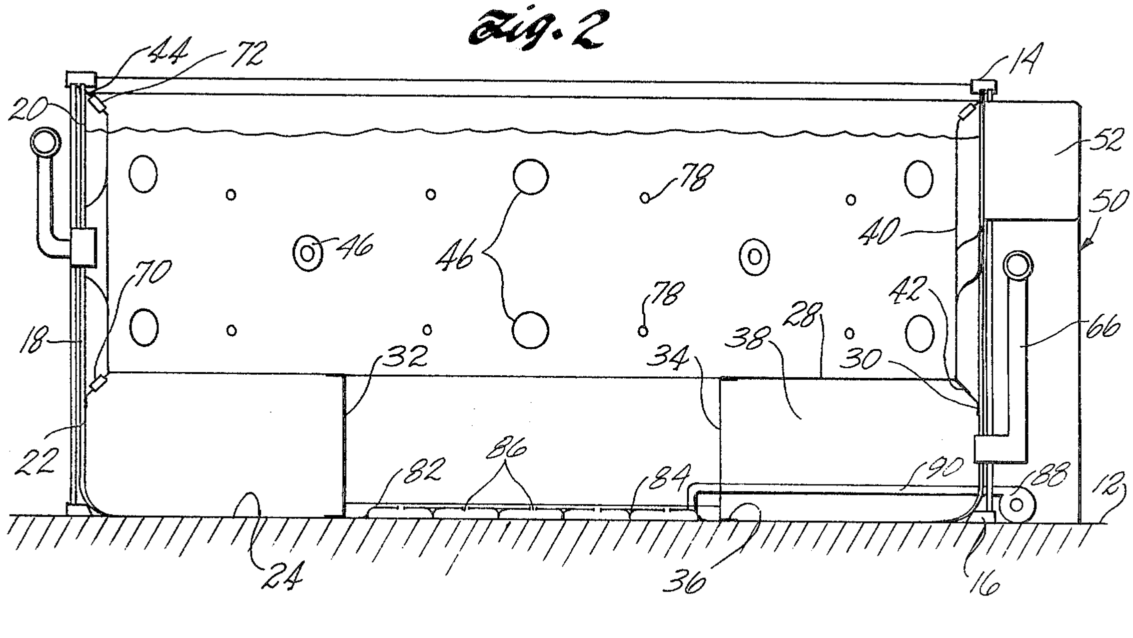
FIG. 2 is a cross-sectional view taken on the line 2—2 of FIG. 1.

Referring to the drawings in detail, the pool, indicated generally at 10, is assembled and supported on a flat surface 12 which may be a floor or level area of ground. The pool is constructed in a manner of conventional above-ground swimming pools, such as described in U.S. Pat. No. 3,233,251. Thus upper and lower circular frames 14 and 16 are provided having slots into which the upper and lower edges of a semi-rigid side wall 18 are inserted. The side wall may be made of thin gauge metal or plastic material. Added vertical strength may be provided by a plurality of upright frame members 18*a* secured at their ends to the upper and lower circular rails 14 and 16.

A flexible waterproof liner, indicated generally at 20, of vinyl or other suitable plastic material extends around the inside of the side wall 18 and across the bottom of the pool. The liner, which is of double-walled construction, includes an outer vinyl sheet 22 which extends around the inside of the side wall with the top edge of the sheet extending over the top edge of the side wall where it is secured in place by the clamping effect of the top rail 14. The outer sheet 22 includes a circular bottom portion 24 which overlaps and is heat sealed to the side wall portion around the outer perimeter.

The inner wall of the double-walled liner includes an annular seat-forming section 28 which is parallel to but spaced from the bottom 24. The outer edge of the seat portion 28 is attached around its perimeter to the side wall by heat sealing, as indicated at 30. A portion 32 of the inner wall is joined to the seat portion 28 around the inner edge thereof, as indicated at 34, and is joined at the lower edge to the bottom 24, as indicated at 36. Thus an annular confined space 38 is provided by the double-walled construction of the liner, which space is inflated by water and under pressure in a manner hereinafter described in detail, to form a bench or seat extending around the inside of the pool.

The double-walled construction of the liner also extends up the sides of the pool. The inner wall includes an inner sheet of vinyl 40 secured around its lower edge to the seat portion 28, as indicated at 42, and secured at its upper edge to the outer wall of the vinyl liner, as indicated at 44. In addition, the inner sheet 40 is attached by heat sealing to the outer wall at small circular areas, which as indicated at 46, to maintain the shape of the inner wall when the space between the inner and outer side walls is inflated with water, as hereinafter described.

Attached to the outside of the pool is a combined filter and pump unit 50, which may be of the self-contained vertically arranged construction described in copending application Ser. No. 647,571, filed Jan. 8, 1976, entitled "Integral Pump Skimmer and Filter Unit For Above-Ground Swimming Pools," and assigned to the same assignee as the present application, and hereby incorporated by reference. The unit 50 includes an intake portion 52 for taking water from the pool when it is filled. The water is withdrawn through a filter and pump (not shown). The unit 50 may also include conventional heating means (not shown) for maintaining the temperature of the water in the pool at the desired level. Water from the recirculating pump unit 50 is discharged through a pair of outlets 54 and 56. The outlet 54 is connected by means of a pipe 58 to arcuately spaced hydrojets, three of which are indicated at 60, through which the recirculating water is discharged into the pool. The hydrojets are located at some of the circular areas 46 where the inner and outer walls of the liner are joined together. The hydrogets may be of a type which mixes air with the water by means of an aspirator, if desired, to introduce bubbles into the pool. The outlet of the pump also is connected through a pipe 62 to additional hydrojets, two of which are indicated at 64 in the side wall of the pool.

In addition, the outlet 56 is connected through a pipe 66 extending downwardly toward the lower edge of the side of the pool, the pipe 66 opening into the pool at the level of the confined space 38 forming the seat. Thus the pump discharges water under pressure into the confined space, thereby inflating the seat, putting the inner wall of the liner formed by the seat portion 28 and cylindrical portion 32 under slight tension. Water discharged through the pipe 66 after entering the confined space 38 is also forced up into the confined space between the side walls of the double-walled liner through ports, such as indicated at 70. Air bleeder valves, as indicated at 72, are provided around the top edge of the double-walled liner, which allows air to escape from the confined spaces of the double-walled liner as water is forced in through the pipe 66 by the recirculating pump unit 59. Once air is at least partially removed from the confined spacing of the double-walled liner, the valves 72 are closed. For example, the air valves may be closed when the water level rises to the level in the pool, leaving air trapped in the top portion of the seat back. Alternatively, air forced out of the confined spaces of the double-walled liner may be directed through a line 74 leading into the skimmer.

It will be seen that once the confined spaces of the double-walled liner are filled with water, the flow through the pipe 66 will substantially cease, but a static head of pressure will be maintained on the water in the confined spaces. The discharge flow of the pump will be directed into the pool through the hydrojets 60 and 64. However, a plurality of additional water jets may be provided by a series of very small openings, indicated at 78, positioned in the seat 28 and in the inner sheet 40 around the sides of the pool. Water discharged through the openings 78 provides additional massaging action and at the same time provides for a continuous although limited flow of water through the confined spaces formed by the double-walled construction of the liner.

The bottom area of the pool surrounded by the seat may be provided with an inner wall 82 which is attached to the liner at a plurality of points 84. Air is pumped into the spaced formed by the inner wall and liner which is released through openings 86. The air is received from a pump 88 through a tube 90. The air bubbles up through the pool to give a massaging effect.

While the above description represents the preferred embodiment, it will be appreciated that the shape and size of the inflated seats can be varied as desired. Moreover the inflated seats need not necessarily be attached to the bottom or sides of the pool, in which case they would not use the outer wall of the liner as part of the seat structure, but would be self-contained inflatable units. This would permit the seats to be removable, if desired. The confined space of the individual seats would still be connected to the pump outlet through suitable conduit means to maintain the seats in an inflated condition.

The pump operates to fill the confined spaces with water to force out the air. The pump maintains sufficient pressure in the confined spaces to support the weight of persons seated in the spa, which weight of course is substantially reduced by the buoyant effect of the water. At the same time the pump provides a continuous flow of recirculating water through holes in the seat and through the hydrojets to provide the desired massaging action. No valves or other controls are required to operate the pool. Merely turning on the pump when the spa is being used insures proper inflation of the seats and recirculation of filtered and heated water.

It will be evident from the above description that the invention provides a portable space which can be packaged and sold in the manner of above-ground swimming pools. It can be provided with external decking, if desired. Also, the seat may extend only partially around the inner circumference of the pool, leaving a space within the pool for steps to be provided to make it easier to enter or exit the pool.

What is claimed is:

1. A portable pool unit comprising a confining outer wall, a double-wall liner extending around the inside of the outer wall, the liner having an outer sheet of thin flexible material forming the bottom and sides of the pool and an inner sheet of thin flexible material attached and sealed around the margins to the outer sheet to form a confined space between the two sheets, pump means having an inlet and outlet, fluid conduit means coupling the pump means to the pool for recirculating water in the pool when the pool is filled, and conduit means connecting the outlet from the pump means to the confined space between the inner and outer sheets to inflate the confined space with water from the pump.

2. The pool of claim 2 wherein the inner sheet includes a portion shaped when inflated to form a raised seat on the bottom of the pool.

3. The pool of claim 2 wherein the raised seat extends inwardly from the side of the pool.

4. The pool of claim 3 wherein the inner sheet includes a portion extending above the seat portion and shaped to form a backrest when inflated.

5. The pool of claim 4 wherein the conduit means connecting the pump to the confined space of the double-walled liner is connected to the space adjacent the bottom of the pool, and bleeder valve means communicating with said space is positioned in the liner adjacent the top of the pool to bleed air out of the confined space.

6. The pool of claim 1 wherein the inner sheet has a plurality of holes for discharging water into the pool from the confined spaces of the double-wall liner.

7. In a pool having a liner forming a container for water and a pump for recirculating the water in the container, seating apparatus for the pool comprising a thin flexible member forming a fully enclosed space and adapted to be positioned beneath the water in the container, and conduit means coupling water discharged from the outlet of the pump into said enclosed space, the pump forcing water into the space to inflate the flexible member into a seat.

8. Apparatus of claim 7 further including bleeder openings in the member for releasing air and water from the confined space.

9. Apparatus of claim 8 wherein the liner of the pool forms a portion of the member.

10. A portable spa comprising a confining side wall of non-stretching material, a flexible watertight liner positioned inside the side wall and extending across a supporting surface to form the bottom of the spa, the liner being fillable with water, recirculating pump means having an inlet and outlet attached to the spa for withdrawing water from and returning the water to the spa under pressure, seat means positioned in the pool including an outer wall of thin flexible material forming a confined inflatable space, and conduit means connecting the seat means to the outlet of the pump means, at least a portion of the water from the outlet of the pump means being directed to the confined space in the seat means to keep said confined space filled with water at a pressure greater than the ambient pressure of water in the spa.

11. The spa of claim 10 wherein the liner forms a portion of the outer wall of the seat means.

12. The spa of claim 11 wherein the flexible material forming the outer wall of the seat means has a plurality of small holes therein for continuously discharging water from the confined space under pressure from the pump into the adjacent volume of the spa.

13. The spa of claim 11 further including a plurality of hydrojets in the side wall of the spa, the hydrojets being fluid connected to the outlet of the pump and discharging through the liner into the adjacent volume of the spa.

14. The spa of claim 10 wherein an inner wall of flexible material extends across a portion of the bottom and forming a plenum with the liner, the inner wall having holes therein, and means for pumping air into the plenum, the air escaping as bubbles from said holes.

* * * * *